United States Patent
Santos et al.

(10) Patent No.: US 11,501,062 B1
(45) Date of Patent: Nov. 15, 2022

(54) SYSTEMS AND METHODS FOR DISPLAYING DATA INCLUDING HIERARCHICAL HEADERS

(71) Applicant: The MathWorks, Inc., Natick, MA (US)

(72) Inventors: Peter Santos, Natick, MA (US); Jason Voccia, Wellesely, MA (US); Divyesh Jani, Natick, MA (US); Stephen Scaringi, Southborough, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 16/790,487

(22) Filed: Feb. 13, 2020

(51) Int. Cl.
*G06F 40/00* (2020.01)
*G06F 40/18* (2020.01)
*G06F 3/0485* (2022.01)

(52) U.S. Cl.
CPC ............ *G06F 40/18* (2020.01); *G06F 3/0485* (2013.01)

(58) Field of Classification Search
CPC .............................. G06F 40/18; G06F 3/0485
See application file for complete search history.

(56) References Cited

U.S. PATENT DOCUMENTS

| | | | |
|---|---|---|---|
| 7,328,400 B2* | 2/2008 | Van Patten Benhase | G06F 40/177 715/227 |
| 11,062,133 B2* | 7/2021 | Foncubierta Rodriguez | G06K 9/00449 |
| 11,227,105 B1* | 1/2022 | Samadani | G06F 3/0486 |
| 2006/0107230 A1* | 5/2006 | Sanderson | G06F 3/0485 715/786 |
| 2009/0049372 A1* | 2/2009 | Goldberg | G06F 16/283 715/227 |
| 2011/0307772 A1* | 12/2011 | Lloyd | G06F 40/18 715/212 |
| 2013/0024803 A1* | 1/2013 | Workman | G06F 3/04886 715/781 |
| 2013/0117648 A1* | 5/2013 | Boutin | G06F 40/18 715/212 |
| 2014/0095537 A1* | 4/2014 | Park | G06F 16/2456 707/770 |
| 2018/0060292 A1* | 3/2018 | Rullan | G06F 40/18 |

(Continued)

*Primary Examiner* — Scott T Baderman
*Assistant Examiner* — Barbara M Level
(74) *Attorney, Agent, or Firm* — Finnegan, Henderson, Farabow, Garrett & Dunner, LLP

(57) ABSTRACT

Systems and methods for displaying hierarchical table headers as disclosed. The systems and methods can include operations performed by a viewer engine. The operations can include detecting a user interaction with a display of a portion of data. The operations can further include determining a second portion of the data to display. The operations can additionally include obtaining data information for the second portion of the data. The data information can include information about headers for the second portion of the data and information about child-parent relationships between the headers. The operations can include determining one or more hierarchical headers for the second portion of the data. The operations can further include rendering a table including the second portion of the data. The operations can additionally include displaying a display depicted the one or more hierarchical headers and a subset of the table including the second portion of the data.

21 Claims, 9 Drawing Sheets

(56) References Cited

U.S. PATENT DOCUMENTS

2019/0065442 A1* 2/2019 Rommel ............... G06F 40/114
2020/0142546 A1* 5/2020 Breedvelt-Schouten ...................
                                                    G06F 3/0485
2020/0401798 A1* 12/2020 Foncubierta Rodriguez ...............
                                                    G06T 7/70

* cited by examiner

Span Header Row 141

Parent Header 143

140

| Product Variant | | |
|---|---|---|
| Size | Color | Logo |
| | | Shape |
| 1 | Small | Blue | Circle |
| 2 | X-Small | Green | Triangle |
| 3 | Medium | Orange | Square |
| 4 | Large | Red | Rectangle |
| 5 | Small | Teal | Circle |

Child Header 145

Span Header Row 151

150

| | | | On Order |
|---|---|---|---|
| | Color | Logo | |
| | | Shape | |
| 1 | Blue | Circle | ☑ |
| 2 | Green | Triangle | ☑ |
| 3 | Orange | Square | ☐ |
| 4 | Red | Rectangle | ☐ |
| 5 | Teal | Circle | ☑ |

| | Product Variant | | On Order |
|---|---|---|---|
| | Size | Shape | |
| 1 | Small | Circle | ✓ |
| 2 | X-Small | Triangle | ✓ |
| 3 | Medium | Square | ☐ |
| 4 | Large | Rectangle | ☐ |
| 5 | Small | Circle | ✓ |
| 6 | X-Small | Triangle | ✓ |

Inserted Column 531

530

| | Product Variant | | |
|---|---|---|---|
| | Size | Color | Shape |
| 1 | Small | Blue | Circle |
| 2 | X-Small | Green | Triangle |
| 3 | Medium | Orange | Square |
| 4 | Large | Red | Rectangle |
| 5 | Small | Teal | Circle |
| 6 | X-Small | Purple | Triangle |

Adjusted Scrollbar 533

FIG. 5

SYSTEMS AND METHODS FOR DISPLAYING DATA INCLUDING HIERARCHICAL HEADERS

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in and constitute a part of this specification, illustrate several embodiments consistent with the disclosure and, together with the description, serve to explain the principles of the disclosure. In the drawings:

FIGS. 1A and 1B depict the example displays of data in response to user interactions with a viewer, consistent with disclosed embodiments.

FIG. 5 depicts updating an exemplary display in response to receipt of streaming data information, consistent with disclosed embodiments.

DETAILED DESCRIPTION

Figure 1A:
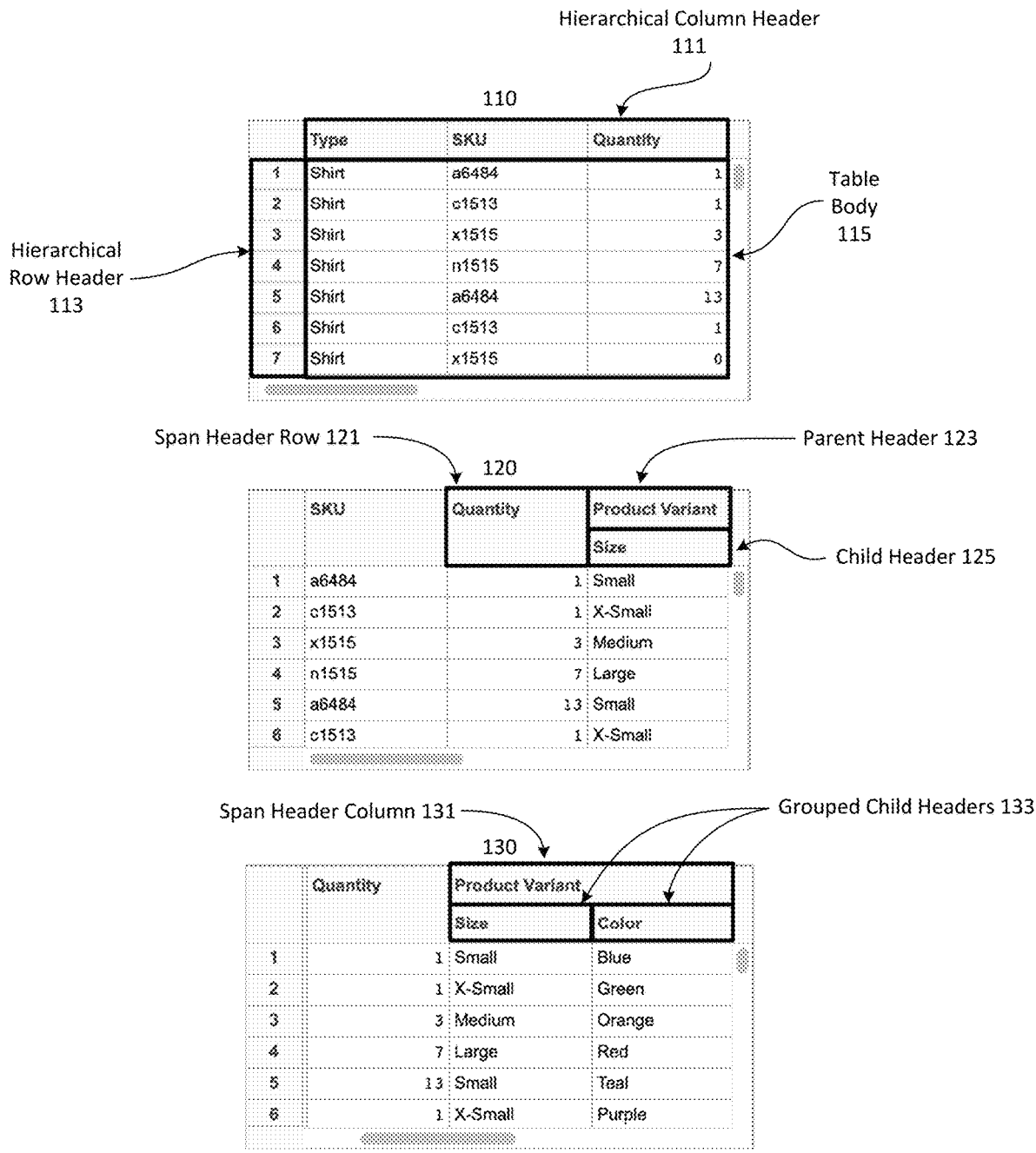

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. For example, unless otherwise indicated, method steps disclosed in the figures can be rearranged, combined, or divided without departing from the envisioned embodiments. Similarly, additional steps may be added or steps may be removed without departing from the envisioned embodiments. Thus, the materials, methods, and examples are illustrative only and are not intended to be necessarily limiting.

Viewing or analysis of large datasets can yield valuable insights, but existing tools are inadequate for interacting with such datasets, which can, when represented in tabular form, include thousands to millions of columns and thousands to millions of rows. Furthermore, some datasets can be formed using streaming data. For such datasets, the number of columns or rows may continue to increase as streamed data is added. Furthermore, data in such datasets may have complex hierarchical interdependencies. Users can benefit from displays depicting these interdependencies, as such depictions may make the data easier to understand. For example, hierarchical headers enable tables to depict interdependencies between data columns or between data rows. Related columns (or related rows) can be labeled with individual headers, which can be grouped together under parent headers, revealing relationships between the columns (or rows) and making the table easier for users to understand. However, when dealing with datasets including thousands to millions of columns and thousands to millions of rows, generating tables with such hierarchical headers can be technically difficult. Rendering the entire dataset as a table and then navigating through this table may be impractical or even impossible. Even generation of hierarchical headers for a portion of the dataset may be technically challenging, as the metadata describing the individual headers and their child-parent relationships may be too large for efficient processing. Such technical challenges can negatively affect user experience with tools for displaying large datasets. Because of the computational requirements associated with generating tables and hierarchical headers for datasets including thousands to millions of columns and thousands to millions of rows, existing tools may exhibit a noticeable delay between receipt of user input and updating of the display. Such a delay may frustrate users and hinder viewing or analysis of the dataset.

The disclosed systems and methods provide displays depicting portions of datasets of potentially unlimited size from a data source using a viewer engine and a view model. The viewer engine and the view model can be located at the client site, e.g., where the user is viewing the data, while the data source can be remote, e.g., from a cloud or other remote locations, or be local. The view model can store data information obtained from the datasource, providing portions of this data information in response to requests from the viewer engine. By using the view model as an intermediary, resource-intensive and time-consuming requests by the viewer engine to the datasource can be avoided, allowing the viewer engine to efficiently and smoothly display data requested through user interactions. The desired data can be displayed dynamically and in a just-in-time manner as the user interaction takes place. User perception of delays between displaying the desired data and the user interaction can be minimized, i.e., user can experience just-in-time response of the data display to the user interaction without perceiving much delay. The disclosed systems and methods are not limited to any particular datatype. For example, the datasets can include instances of numeric, character, string, date and time, logical, categorical, object, or datatypes. The disclosed systems and methods are not limited to any particular source of data. For example, the dataset can include stored or streamed data; data generated by sensors or software tools; data retrieved from other systems; or the like.

A display in accordance with disclosed embodiments can include hierarchical headers depicting child-parent relationships between columns or between rows of the depicted data. Consistent with disclosed embodiments, the viewer engine can render a portion of the dataset in a two-dimensional format (e.g., a two-dimensional table) for convenience of display on a two-dimensional display. A subset of the table, or the entire table, can then be displayed to the user. In some implementations, the rendering of the display format and the display of the display format can be sequential or simultaneous. For example, in the sequential example, a table is rendered and then displayed. In another simultaneous example, the table portion is displayed as the portion is rendered. Although the disclosure describes displaying a subset of the table as examples, the methods and systems of the disclosure can display the entire rendered table of a portion of the dataset, after the rendering or simultaneously with the rendering.

The disclosed embodiments are not limited to two-dimensional displays. For example, a higher dimensional table, e.g., 3D table or nD table where n>2, can be displayed on a two-dimensional display. Such higher dimensional tables can be displayed in a high dimensional manner such that a user can toggle the views to review different dimensions. For example, a 3D table can be displayed in a 3D manner. The table, 2D or higher dimensional, can be a data structure, e.g., an object, that contains numerical or other types of data values, and additionally other characteristics associated with the data. For example, the data structure can contain other characteristics such as dimensionality of the data, header information, and categories of data used to dynamically group data as its displayed. Although the disclosure describes methods and systems using examples of 2D table displays, the methods and systems can be readily applied to higher dimensional table or data structure displays. For example, each two dimensions of the multiple dimensions of the table or data structure can be handled by the methods and systems as described.

The viewer engine can create hierarchical headers for the displayed subset of the table based on the individual headers associated with the displayed columns and rows of the table. In response to user interactions (e.g., keypresses, mouse clicks, touchscreen gestures), the viewer engine can determine a new portion of the data from the viewer model to display, update the display to depict the new portion, and update the hierarchical headers based on the newly displayed columns and rows. In some embodiments, the viewer engine can create the hierarchical headers without any a-priori knowledge of the child-parent relationships between the individual headers that are being paged into the display. When the new portion of the data to display falls within the pre-rendered table, the viewer engine can shift the displayed subset of the table to encompass the new portion of the data. When the new portion of the data falls outside the pre-rendered table, the viewer engine can obtain data information for the new portion of the data from a view model. Because the viewer engine need only process the data information in the obtained portion of the dataset, any delay between receipt of user input and updating of the display may be imperceptible to the user. Accordingly, the disclosed system and methods can provide an improved user experience.

The disclosed embodiments can enable smooth and natural interactions with datasets of potentially unlimited size. As data information need only be retrieved for a portion of the data, memory and processing requirements at the client site may be bounded, even when the size of the dataset is not. Creation of the hierarchical header may only require processing child-parent relationships for individual headers associated with the displayed rows and columns, rather than child-parent relationships for the individual headers in the entire dataset. The coordinated interaction of the viewer engine, view model, and datasource can decrease the delay between receipt of a user interaction and depiction of an updated display. The view model can rapidly service viewer engine requests while retrieving, in the background and from the datasource, data information needed to service potential viewer engine requests. As a result, the delay between user interactions and updating of the display may be imperceptible to the user, improving the ability of the user to view or analyze large datasets. Accordingly, the disclosed embodiments provide a technical improvement over existing methods of accessing large datasets.

FIGS. 1A and 1B depict the results of successive user interactions with a display of portions of data, consistent with disclosed embodiments. The display can be rendered by a viewer engine and can be, or be part of, a graphical user interface. The display can enable a user to view a portion of data. The data can include values, each associated with two or more attributes (e.g., a column attribute and an observation number, for a relational database). The data can include metadata describing the attributes and relationships among the attributes (e.g., child-parent relationships, as described herein). The disclosed embodiments are not limited to a particular data model. For example, the data in the datasource can be stored or organized as a relational database and related metadata (e.g., header information, or the like), an object-oriented database, a document-oriented database, or the like. As shown in FIGS. 1A and 1B, in response to a user movement of the thumb of a scrollbar, the hierarchical headers depicted in the display can be updated based on individual headers associated with newly displayed data. The updated hierarchical headers can provide users information about interdependencies in the data, helping users understand the data. The hierarchical headers can further improve the user experience by supporting additional operations, such as filtering rows based on data values in the columns or adding rows or columns into the hierarchical headers at specific locations.

The viewer engine can obtain data information describing the portion of data from a view model, which can be configured to store a subset of the data. The data information can include data values associated with a subset of attributes or attribute values (e.g., when the data information is organized as a relational database, a subset of columns and a subset of observations in the relational database). As depicted in FIGS. 1A and 1B, user interactions with the display (e.g., movement of the thumb of a scrollbar) can cause the viewer engine to obtain data information for portions of the data in addition to the portion currently displayed.

In some embodiments, the viewer engine can be configured to render the portion of data information as a table, some attributes or attribute values of the data information defining table columns and others defining table rows. The data values can be represented in cells in the table, each cell having a location specified by the attributes or attribute values associated with that data value. For example, as depicted in display 110, the value "n1515" can be associated with the attribute "SKU" and the attribute value "4". The combination of this attribute and attribute value can define the column and row of the cell for the data value "n1515". As an additional example, the data value "n1515" can be associated with the attributes "column index" and "row index", each having an attribute value. The values of these attributes can define the column and row of the cell for the data value "n1515". In some embodiments, individual headers associated with columns or rows can be generated from the portion of data information. Such headers can be used to generate a hierarchical header for display with the table, in accordance with disclosed embodiments.

In some embodiments, the portion of data information rendered by the viewer engine can be a very small subset of the data information for all of the data. As a non-limiting example, the data information for the data corresponding to the display in FIGS. 1A and 1B, when rendered as a table, may include 98,696,044 rows and 27,182 columns. In contrast, to continue this non-limiting example, the rendered table may only include 7 columns and 11 rows. In some embodiments, the display can depict a subset of the rendered table. To continue this non-limiting example, the viewer engine can render the portion of data information as a table including 7 columns and 11 rows, but the display may only depict the central 3 columns and 7 rows of the table, as shown in FIGS. 1A and 1B. Accordingly, the depicted subset of the rendered table can be shifted two columns or two rows in any direction (e.g., in response to a user interaction) without having to re-render the table or obtain another portion of data information from the view model. The particular number of columns and rows depicted in the display may depend on the size of the columns and the width of the display. The disclosed embodiments are not limited to any particular number of depicted columns or rows.

FIG. 1A depicts an exemplary display 110, consistent with disclosed embodiments.

Display 110 can display table body 115, including data values arranged in rows and columns, as described herein, together with hierarchical headers. The hierarchical headers can include a hierarchical column header 111 and a hierarchical row header 113. Column header 111 can include individual headers associated with individual columns (e.g., a first header "type" associated with the first column, as shown). Row header 113 can include individual headers associated with individual rows (e.g., a first header "1" associated with the first row, as shown). The hierarchical headers can be positioned adjacent to table body 115, aligning individual headers with the rows or columns with which they are associated (e.g., first header "type" is aligned with the first column, as shown). Hierarchical column header 111 can be positioned above or below table body 115, without limitation. Hierarchical row header 113 can be positioned to the left or right of table body 115, without limitation. The display can include controls, such as scroll bars (as shown), "next" buttons, paging arrows, or the like. A user can interact with the viewer engine by interacting with such controls or with table body 115. Interactions can include keypresses (e.g., selecting a control or cell using "tab" and activating the control or cell using "enter"); selection and activation using a trackball, trackpad, mouse, pointing stick, or the like; touch screen gestures (e.g. pressing and dragging table body 115 to view another portion of the data, or the like). The described controls and interactions are intended to be exemplary, and not limiting.

FIG. 1A also depicts an exemplary display 120, consistent with disclosed embodiments. The viewer engine can depict display 120 in response to a user interaction indicating that the depicted subset of the rendered table in display 110 should shift one column of the table to the left. In this nonlimiting example, such an indication could include moving the thumb of the scrollbar to the right, as depicted in FIG. 1A. The viewer engine can update the hierarchical column header based, at least in part, on individual headers associated with the newly displayed column. In display 120, for example, the newly displayed column is associated with the individual headers "Size" and "Product Variant". The individual header "Size" is a child of the individual header "Product Variant". The viewer engine can update the hierarchical column header to include these individual headers.

As depicted in display 120, a column (or a row) can be associated with multiple individual headers. For example, the rightmost column displayed in display 120 is associated with two individual headers. A child-parent relationship can exist between the two individual headers: one header (child header 125) can be the child of the other header (parent header 123). Such a child-parent relationship can be hierarchical, with a higher-level header associated with one or more lower-level headers. In some embodiments, the upper-level header can have an is-a relationship with the lower-level header (e.g., a class-subclass relationship), a has-a relationship with the lower-level header (e.g., set-part relationship where the higher-level header describes a set and the lower-level header describes a part of the set, a part-of relationship (e.g., where the higher-level header describes a whole and the lower level header describes a component, aspect, or attribute of the whole), or a like type of relationship. The column header can be hierarchical, with the position of parent header 123 relative to child header 125 indicating the relationship between them. In some embodiments, child header 125 can be positioned closer to table body 115 than parent header. For example, in a hierarchical column header, when the hierarchical column header is placed above the table body 115, an individual child column (e.g., child header 125) can be placed below the individual parent column (e.g., parent header 123). As an additional example, in a hierarchical row header, when the hierarchical row header is placed to the left of the table body 115, an individual child row can be placed to the right of the individual parent row.

In some embodiments, the viewer engine can be configured to determine trees representing child-parent relationships among the individual headers for a portion of data. The viewer engine can determine the trees by tracing the child-parent relationships from child to parent. For example, an individual header having no children can be identified (e.g., "Size" in display 120 lacks child headers). This individual header can be identified as a child of another header. For example, an attribute of the individual header can indicate that it is a child of another header (e.g., "Size" is a child of "Product Variant" in display 120). The viewer engine can then determine whether the other header is in turn a child of yet another header. The disclosed embodiments are not limited to any particular method of creating such trees.

As depicted in display 120, a size of a hierarchical header can depend on the child-parent relationships between individual headers in the hierarchical header. For example, among the individual column headers included in the hierarchical column header for display 120, the individual column headers "SKU" and "Quantity" both have no hierarchical relationship with another individual column header. The individual column header "Product Variant" is the parent of the individual column header "Size". Placing the individual column header "Product Variant" above the individual column header "Size" creates two levels of headers in the hierarchical column header of display 120. In some embodiments, the hierarchical header can include a number of levels based on the maximum height of any tree representing child-parent relationships among the individual headers. For example, when the maximum height of any such tree is one (e.g., as shown in display 120), the number of levels is two.

Individual headers in a hierarchical header can span multiple levels, consistent with disclosed embodiments. For example, in display 120, span header row 121 (e.g., the "Quantity" individual header) spans two levels. In some embodiments, the viewer engine can generate trees representing the child-parent relationships among the individual headers in the hierarchical header. The leaf nodes of such trees can be the individual headers that lack child individual headers. The span of such an individual header can be based on a maximum tree height among trees for the hierarchical header and the depth of the individual header in the tree including the individual header. In some embodiments, the span can be one plus the difference between the maximum tree height among trees for the hierarchical header and the depth of the individual header in the tree including the individual header.

FIG. 1A further depicts an exemplary display 130, consistent with disclosed embodiments. The viewer engine can depict display 130 in response to a user interaction indicating that the depicted subset of the rendered table in display 120 should shift one column of the table to the left. The viewer engine can update the hierarchical column header based, at least in part, on individual headers associated with the newly displayed column. In display 130, the new, right-most column is associated with the individual headers "color" and "product variant". The individual header "color" is a child of the individual header "product variant". The viewer engine can update the hierarchical column header to include the individual header "color" and group the individual child headers "size" and "color" under the individual parent header "product variant".

In some embodiments, each individual header without a parent header can be associated with a single column index. The individual child headers of a single parent header can each be associated with an index in a continuous range of indices. In some embodiments, each parent header can be associated with an indication of the continuous range of indices spanned by its child headers (e.g., the beginning and end indices, the beginning index and the number of columns, the entire set of indices, or the like). In various embodiments, columns or rows associated with individual headers can be grouped based on child-parent relationships of the individual headers. For example, when two individual column headers are children of a parent header, columns associated with the two individual columns header can be grouped together (e.g., grouped child headers 133 in display 130).

In various embodiments, individual headers without child headers can have extents (e.g., individual column headers may have widths and individual row headers may have heights). In some embodiments, an individual header with child headers can have an extent that depends on the extents of the child headers. The extent of an individual parent header, for example, can depend on a sum of the extents of the child headers of that parent header. As depicted in display 130, the extent of span header column 131 equals the sum of the extents of grouped child headers 133.

FIG. 1B depicts an exemplary display 140, consistent with disclosed embodiments. The viewer engine can depict display 140 in response to a user interaction indicating that the depicted subset of the rendered table in display 120 should shift one column of the table to the left. The viewer engine can update the hierarchical column header depicted in display 140 based, at least in part, on individual headers associated with the newly displayed column of display 140. In display 140, the new column is associated with the individual headers "Shape", "Logo", and "Product Variant". The individual header "Shape" is a child of the individual header "Logo", which in turn is a child of the individual header "Product Variant". The viewer engine can update the hierarchical column header to include the individual headers "Shape" and "Logo", group the individual header "Shape" under the individual header "Logo", and group the individual headers "Size", "Color", and "Logo" under the individual header product variant. The viewer engine can generate trees representing child-parent relationships among individual headers by tracing child-parent relationships from child headers to parent headers (e.g., identifying "size"→"product variant", "color"→"product variant", and "shape"→"logo"→"product variant"). The maximum tree height among the trees is two, so the hierarchical header can include three levels (e.g., the maximum height plus one). The number of levels spanned by the individual header "Size", plus the number of levels spanned by individual header "Product Variant" must equal three. Accordingly, there is an additional level associated with this chain of child-parent relationships. This additional level is assigned to the individual header "Size", which consequently spans two level. For similar reasons, the individual header "Color" (e.g., span header row 141) spans two levels. The extent of individual header "Product Variant" is the sum of the widths of the individual child headers "Size", "Color", and "Logo". The extent of the individual header "Logo" is the width of the individual child header "Shape".

FIG. 1B also depicts an exemplary display 150, consistent with disclosed embodiments. The viewer engine can depict display 150 in response to a user interaction indicating that the depicted subset of the rendered table in display 120 should shift one column of the table to the left. The viewer engine can update the hierarchical column header based on individual headers associated with the newly displayed column. In display 150, the new column is associated with the individual header "On Order" (e.g., span header row 151), which is neither the child nor the parent of another individual header. The viewer engine can update the hierarchical column header to include the individual header "On Order". The number of levels in the hierarchical header remains three. Span header row 151 lacks parent or child individual headers, so the number of levels spanned by span header row 151 equals the number of levels in the hierarchical header (e.g., three levels).

As apparent in FIGS. 1A and 1B, the disclosed embodiments are not limited to a particular datatype or format. For example, displays 110 to 150 include numbers, strings, and objects (e.g., check boxes).

Figure 2:
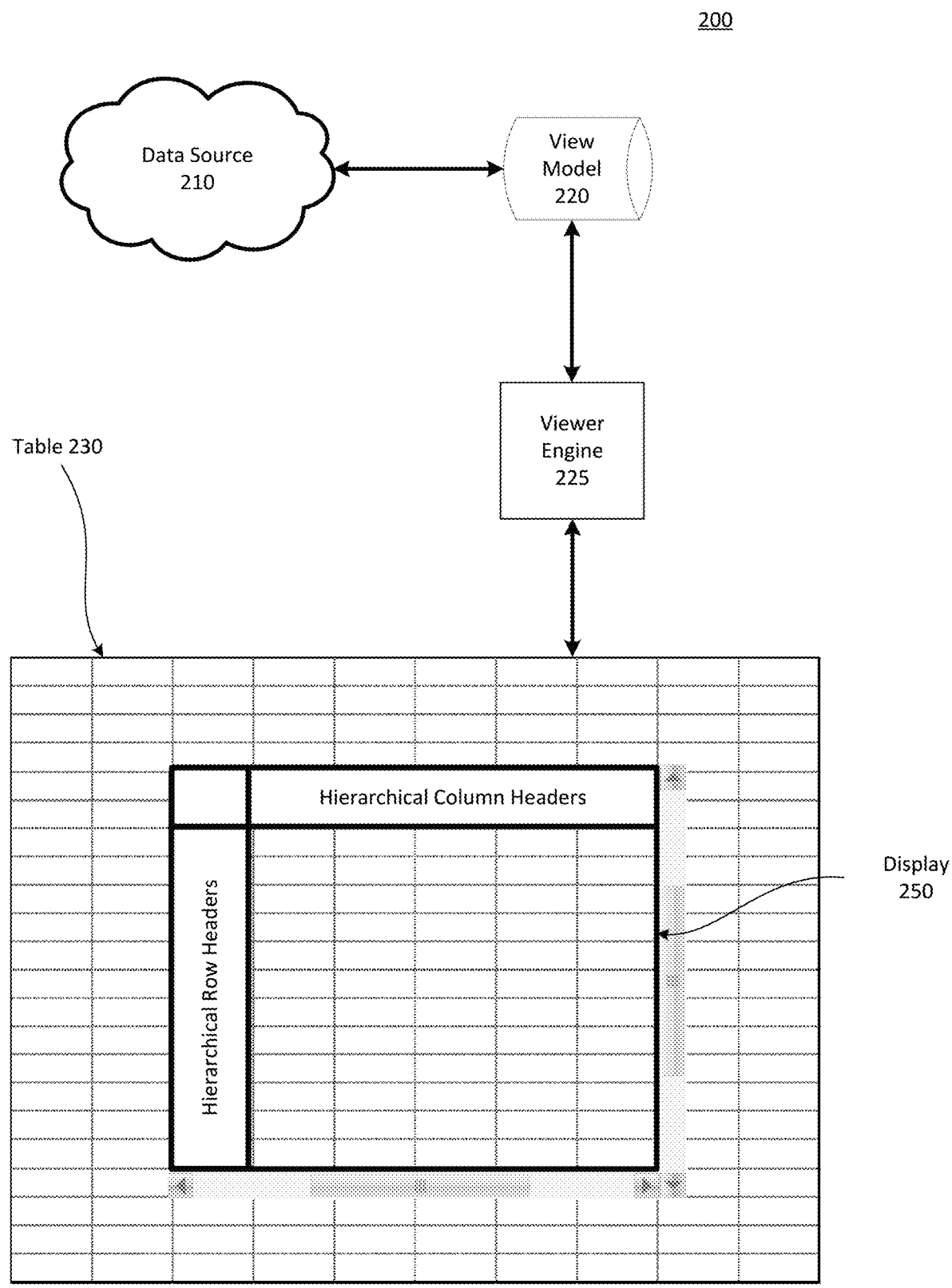
FIG. 2 depicts an exemplary system for obtaining portions of data for display, consistent with disclosed embodiments.

FIG. 2 depicts an exemplary system 200 for obtaining portions of data for display, consistent with disclosed embodiments. System 200 can include a data source 210, a view model 220, and viewer engine 225. Viewer engine 225 can be configured to render data information obtained from view model 220 into a table (e.g., table 230) and display some or all of the table (e.g., display 250).

System 200 can be configured to reduce delays between receipt of a user interaction and a resulting update to display 250, thereby improving the real-time/dynamic response of the system and providing a smoother and more natural user experience. As described herein, viewer engine 225 can respond to user interactions by changing the depicted subset of table 230, if possible, or by obtaining data information from view model 220. Changing the depicted subset of table 230 may require less time and resources than obtaining data information from view model 220. When table 230 is larger, viewer engine 225 may obtain data information from view model 220 less often. Accordingly, table 230 can be sized based on the computational resources associated with maintaining table 230 and the time and computational resources required to obtain data information from view model 220. In some embodiments, to speed response time, viewer engine 225 and display 250 can be implemented on the same client system. For example, a graphical user interface of the client system can include display 250 and the computing device can implement viewer engine 225.

View model 220 can respond to requests or notifications for data information from viewer engine 225 by providing data information local to view model 220, if possible, or by obtaining data information from datasource 210, which can store or generate the data. Obtaining data information from datasource 210 can require additional time and computational resources. When more data information is local to view model 220, viewer engine 225 may obtain data information from datasource 210 less often. Accordingly, the amount of data information local to view model 220 can be chosen based on the computational resources associated with storing such data information and the time and computational resources required to obtain data information from datasource 210.

In some embodiments, the client system may implement both viewer engine 225 and view model 220, reducing time delays associated with viewer engine 225 obtaining data information from view model 220. In various embodiments, view model 220 can be implemented by a system remote to the client system, improving the flexibility of system 200. For example, view model 220 and viewer engine 225 can be implemented by different computing systems; different cloud-computing platforms or computing clusters; or different resources, virtual machines, pods, containers, or the like on a cloud-computing platform.

In some embodiments, view model 220 and datasource 210 can be implemented on the same computing system, reducing time delays associated with view model 220 obtaining data information from datasource 210. For example, datasource 210 could be a database or streaming data source local to a computing system implementing view model 220. In various embodiments, datasource 210 can be implemented by a computing system remote to the computing system implementing view model 220, improving the flexibility of system 200. For example, datasource 210 and view model 220 can be implemented by different computing systems; different cloud-computing platforms or computing clusters; or different resources, virtual machines, pods, containers, or the like on a cloud-computing platform.

Datasource 210 can be configured to store or generate data information, in accordance with disclosed embodiments. Datasource 210 can include one or more databases, which may be hosted on specific computing systems or a cloud-computing platform. Datasource 210 can include a source of steaming data, such as a data socket, a software tool configured to generate streaming data, one or more data acquisition devices (e.g., sensors, test and measurement devices, point of sale terminals), or the like. As described herein, the data information can include data values associated with attributes. The data information can also include metadata describing child-parent relationships among the attributes. The organization of the data information in datasource 210 is not intended to be limiting. For example, without limitation, datasource 210 can be configured to store the data information as a relational database, object-oriented database, document-oriented database, or the like.

Datasource 210 can be configured to provide data information to view model 220, in accordance with disclosed embodiments. Datasource 210 can be configured to provide the data information in response to a request received, directly or indirectly, from view model 220 (e.g., through a messaging service, supervising application, or the like). The request can specify the data information to provide (e.g., in terms of attributes, ranges of attribute values, or the like). Datasource 210 can be configured to deliver the data information to view model 220. In some embodiments, datasource 210 can send the data information based on a notification provided by view model 220. In some embodiments, datasource 210 can stream data information to view model 220 as the data information is generated or acquired. Datasource 210 can provide the data information as relational database tables or query results, objects, documents, or the like.

View model 220 can be configured to obtain data information from datasource 210, in accordance with disclosed embodiments. In some embodiments, view model 220 can be configured to request the data information from datasource 210 and to receive the data information in response to the request. In various embodiments, view model 220 can be configured to receive data information pushed by datasource 210. In some instances, such data information can be streamed by datasource 210 as it is acquired or generated. In some embodiments, view model 220 can set a notification (e.g., a flag, a status, a global variable, or the like) indicating a need for data information. Datasource 210 can detect the notification and, in response to detecting the notification, push data information to view model 220.

In some embodiments, view model 220 can obtain data information from datasource 210 using requests or notifications when view model 220 lacks stored data information necessary to service a current or potential request from viewer engine 225. As a nonlimiting example, view model 220 may store data information for range of columns and rows in a table. A current or potential request from viewer engine 225 may include data information for columns or rows outside the stored range.

View model 220 can determine that it lacks stored data information to service a potential request from the view engine based on the request for data information most recently received from the view engine or a history of requests received from the view engine. The determination can be based on the attributes or attribute ranges associated with the most recently received request or the historical requests. In response to the determination, view model 220 can request additional data information from datasource 210 or notify datasource 210 that additional data is required.

View model 220 can determine that it lacks stored data information to service a potential request when the most recently received request is close to a boundary on the data information stored by view model 220, in accordance with disclosed embodiments. Such a boundary can be a column or row index, an attribute or attribute value, or the like. For example, when the data information is organized as a relational database, view model 220 can be configured to store data information for a buffer of rows and columns around the data information requested by viewer engine 225. To continue this example, when viewer engine 225 requests data information for rows 121 to 140 and columns 111 to 120, view model 220 can obtain data information for rows 101 to 160 and columns 101 to 130. View model 220 can then provide data information for rows 121 to 140 and columns 111 to 120 to viewer engine 225. Should view model 220 receive a request for data information sufficiently close to an outer bound on the data information stored by view model 220 (e.g., sufficiently close to column 100, column 130, row 100, or row 160), view model 220 can request additional data from data source 210 to maintain a buffer of rows and columns around the data information requested by viewer engine 225. For example, should view model 220 subsequently receive a request for data information for rows 102 to 121 and columns 102 to 111, view model 220 can request data information for rows 93 to 100 and columns 93 to 100 to maintain a buffer of rows and columns around the data information requested by viewer engine 225. The size of the buffer, any hysteresis associated with updating the buffer, and the characteristics of a request deemed sufficiently close may depend on the particular application and are not intended to be limiting.

View model 220 can determine that it lacks stored data information to service a potential request when a history of requests by viewer engine 225 indicate movement towards a boundary on the data information stored by view model 220, in accordance with disclosed embodiments. To continue the prior example, when the most recent requests in the history of requests include requests for (i) rows 122 to 141 and columns 111 to 120, (ii) rows 122 to 141 and columns 112 to 121, and (iii) rows 122 to 141 and columns 113 to 123, view model 220 can determine that the displayed columns are shifting progressively to the right and request rows 122 to 141 and columns 131 to 140, in anticipation of subsequent requests for data information by viewer engine 225. The particular heuristics for determining when movement towards a boundary on the data information stored by view model 220 warrants retrieval of additional data information from datasource 210 may depend on the application and are not intended to be limiting.

View model 220 can be configured to provide data information to viewer engine 225, in accordance with disclosed embodiments. View model 220 can be configured to provide the data information in response to a request received, directly or indirectly, from viewer engine 225 (e.g., through a messaging service, supervising application, or the like). The request can specify the data information to provide (e.g., in terms of attributes, ranges of attribute values, or the like). View model 220 can be configured to push the data information to viewer engine 225. View model 220 can push the data information to viewer engine 225 based on a notification provided by viewer engine 225. In some embodiments, view model 220 can stream data information to viewer engine 225. In various embodiments, view model 220 can stream the data information to viewer engine 225 as it is received from datasource 210. View model 220 can provide the data information as relational database tables or query results, objects, documents, or the like.

Viewer engine 225 can be configured to obtain data information from view model 220, in accordance with disclosed embodiments. Viewer engine 225 can be configured to request the data information from view model 220 and to receive the data information in response to the request. Viewer engine 225 can be configured to receive data information pushed by view model 220. In some instances, such data information can be streamed by view model 220 as it is obtained from datasource 210. In some embodiments, viewer engine 225 can set a notification (e.g., a flag, a status, a global variable, or the like) indicating a need for data information. View model 220 can detect the notification and, in response to detecting the notification, push data information to viewer engine 225.

In some embodiments, viewer engine 225 can obtain data information from datasource 210 using requests or notifications when viewer engine 225 lacks stored data information to response to a current or potential user interaction (e.g., a movement of a scrollbar associated with display 250). In some embodiments, viewer engine 225 can request data information from view model 220 or notify view model 220 that data information is required when table 230 does not include data information requested through a user interaction or a potential user interaction. As a nonlimiting example, table 230 may include columns 111 to 120 and rows 111 to 130. Viewer engine 225 can detect a user interaction and determine, based on the user interaction, that columns 211 to 220 and rows 111 to 130 should be displayed. In this example, table 230 does not include these columns, so the viewer engine can request data information for these columns from view model 220. In some embodiments, viewer engine 225 can request additional data information corresponding to additional rows and columns surrounding the requested rows and columns (e.g., columns 201 to 230 and rows 101 to 130). Once received by viewer engine 225, the requested data information can be rendered into a new table. The subset of the table including columns 211 to 220 and rows 111 to 130 can then be displayed in display 250. Because viewer engine 225 received the additional rows and columns surrounding the requested rows and columns, viewer engine 225 may be able to service subsequent user interactions by displaying a differing subset of the new table without having to request additional data information from view model 220.

As can be appreciated from the foregoing discussion, a request from viewer engine 225 to view model 220 can cause view model 220 to request data information from datasource 210. The data information requested by view model 220 can include data information corresponding to additional rows and columns beyond the data information requested by viewer engine 225. Because view model 220 requested data information corresponding to these additional rows and columns, viewer engine 225 may be able to service requests from view model 220 without having to request additional data information from datasource 210.

Table 230 can be generated by viewer engine 225 from data information received by viewer engine 225, consistent with disclosed embodiments. As previously described, data information received from view model 220 may include data values and metadata describing attributes and child-parent relationships among attributes.

Viewer engine 225 can be configured to determine a tabular layout of the data values, consistent with disclosed embodiments. The tabular layout can be determined based on the attributes and attribute values associated with each data value. For example, when data values are associated with row and column indices, viewer engine 225 can determine the tabular layout of the data values based on these row and column indices. In some embodiments, the layout can further depend on the metadata specifying child-parent relationships among the attributes. In such embodiments, viewer engine 225 can be configured to group columns of data values based on attributes or attribute values associated with those columns. For example, a column of data values can be associated with a child attribute of a parent attribute. The column of data values can therefore be grouped with other columns of data values associated with other child attributes of the same parent attribute.

Viewer engine 225 can be configured to render the data values according to the tabular layout. By rendering all of the data values, not just the data values displayed in display 250, the viewer engine can reduce the response time between detection of a user interaction and updating the display, improving the experience of users viewing or analyzing the data using display 250.

Display 250 can be configured to display a subset of rendered table 230, consistent with disclosed embodiments. As shown, display 250 can include hierarchical headers and a table body, as disclosed above with regards to FIGS. 1A and 1B. Display 250 can also include controls enabling a user to interact with viewer engine 225, such as the scroll bars depicted in FIG. 2. The depicted controls are not intended to be limiting. Consistent with disclosed embodiments, a user may interact with viewer engine 225 using a keyboard; human interface devices such as computer mice, trackpads, trackballs, or pointing sticks; or a touch screen (e.g., through selecting elements of display 250 or through gestures such as swiping or the like). In response to user interactions, viewer engine 225 can be configured to update display 250 to depict another subset of table 230 (or, if necessary, obtain data information from view model 220, render a new table, and display a subset of that new table). Updating display 250 can include updating the hierarchical headers, as disclosed above with respect to FIGS. 1A and 1B. In some embodiments, the hierarchical headers can be determined based on the rows and columns depicted in display 250.

Figure 3:
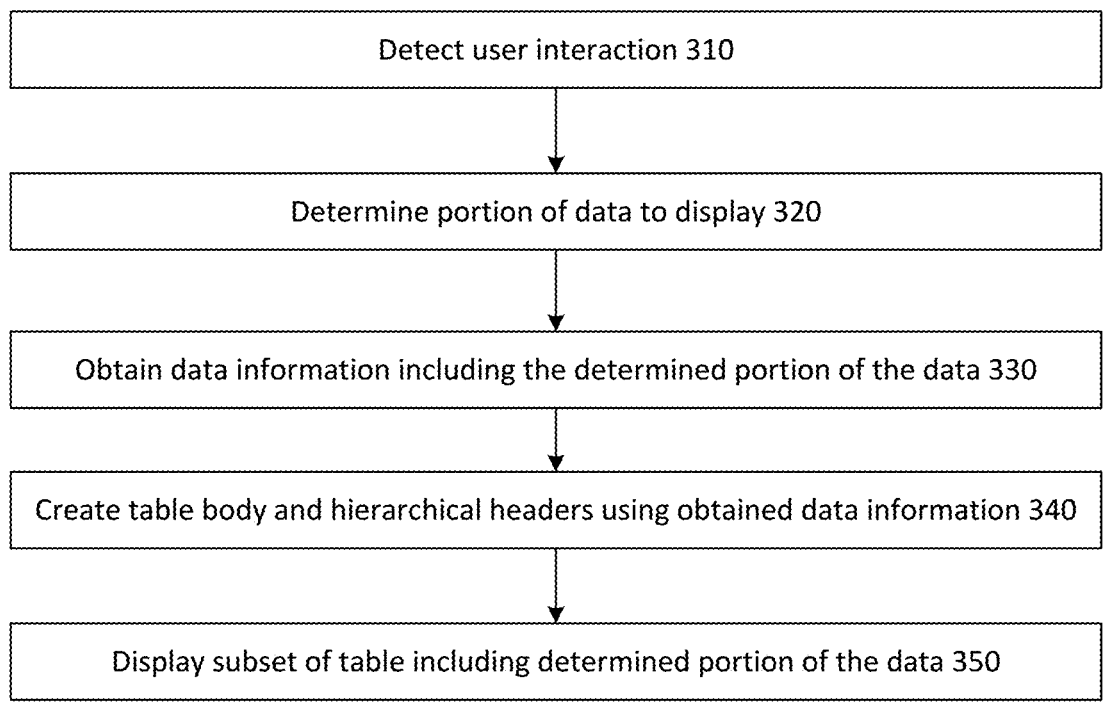
FIG. 3 depicts an exemplary method for displaying a portion of data, consistent with disclosed embodiments.

FIG. 3 depicts an exemplary method 300 for displaying a portion of data, consistent with disclosed embodiments. The data, which need not be organized as a relational database, can be displayed according to method 300 in a tabular form. Method 300 can include the operations of detecting a user interaction, determining a portion of the data to display, based on the user interaction, obtaining data information for the determined portion of the data, creating a table body and hierarchical headers using the obtained data information, and displaying a subset of the table including the determined portion of the data to display. Method 300 can be performed using viewer engine 225 and view model 220 as disclosed with regards to FIG. 2, enabling display of the portion of the data without requiring either retrieval of all of the data or retrieval of a data structure describing the hierarchical headers. Because the disclosed embodiments do not require retrieval of all of the data or retrieval of a data structure describing the hierarchical headers, the disclosed embodiment can enable users to browse datasets with rows or columns numbering in the tens of thousands to millions, without requiring extensive computing resources or resulting in substantial delays in response to user interactions. Accordingly, the disclosed embodiments can improve the experience of users working with large datasets.

In operation 310 of method 300, viewer engine 225 can detect a user interaction. The user interaction can include selection of a control in a user interface (e.g., scrolling a scroll bar, selecting an "advance 5 columns" button, or the like), a keystroke (e.g., an arrow keypress, return keypress, tab keypress, or the like), a gesture on a touchscreen (e.g., a two-finger press and drag, a swipe, or the like), or the like.

In operation 320 of method 300, viewer engine 225 can be configured to determine a portion of the data to display in response to the detected user interaction. In some embodiments, determining the portion of the data to display can include determining an offset from a currently displayed portion of the data. For example, determining the portion of the data to display can include determining such an offset when the user interaction indicates moving a number of columns or rows in a particular direction (e.g., selection of an "advance 10 rows" button, an arrow keypress, return keypress, tab keypress, two-finger press and drag, a swipe, or the like). As an additional example, in response to an arrow keystroke to the right, viewer engine 225 can determine that the depicted set of columns should be shifted one column to the left, with the leftmost column removed from the display and a new rightmost column added.

In various embodiments, determining the portion of the data to display can include determining a position in the data and selecting a portion of the data based on that position. For example, when the user interaction comprises scrolling the thumb of a column scrollbar to the middle of the column scrollbar, the viewer engine can be configured to determine a "middle" column of the data and update the portion of the data to display to be the "middle" column and other columns fitting in the display. In some embodiments, viewer engine 225 can be configured with information mapping thumb positions in the scroll bar to positions in the data. For example, viewer engine 225 can be configured with a total number of column or rows associated with the data (which, as described above, need not be stored as a relational database). In some embodiments, such information can be received from datasource 210 through view model 220. In some embodiments, viewer engine 225 can then determine a starting column or row for the portion of the data based on the proportional location of the thumb position in the scroll bar and the total number of columns or rows associated with the data. For example, when 1,102,234 rows are associated with the data and 3,452,345 columns are associated with the data, a row scrollbar thumb position of 10% and a column scrollbar position of 21% can be approximated as row 110,223 and column 724,992.

In some embodiments, determining the portion of the data to display can depend on a selected level of the hierarchical header. For example, the user interaction can include selecting a level in the hierarchical header (e.g., the user can select parent header 143 in display 140, thereby selecting the second level of the hierarchical header). The user can then move through adjacent sets of rows or columns, the adjacent sets corresponding to adjacent headers at the selected level in the hierarchical header. As a non-limiting example, an individual column at the top level of the hierarchical header can have eight child headers, each associated with a column. The adjacent individual column at the top level of the hierarchical header can have ten child headers. After selecting the top level of the hierarchical header, a right arrow keypress can cause the display to shift eight columns to the left. A further right arrow keypress can cause the display to shift ten columns to the right. In contrast, a down arrow keypress can select the second level of the hierarchical header. A subsequent right arrow keypress would then cause the display to shift one column to the left. The user can select the level in the hierarchy and move through the adjacent sets of rows or columns using a keypress (e.g., a tab keypress, arrow keypress, or the like); a computer mouse, trackpad, trackball, stick mouse, a gesture on a touchscreen (e.g., a two-finger press and drag, a swipe, or the like), or the like. In some embodiments, the data information can include skip lists indicating the beginning and ending column or row index for any individual child headers of an individual parent header. Viewer engine 225 can be configured to use these skip lists to determine the portion of the data to display in embodiments permitting selection of a level of the hierarchical header and movement through adjacent sets of rows or columns corresponding to adjacent headers at the selected level in the hierarchical header.

In some embodiments, viewer engine 225 can be configured to select a portion of the data based on the starting position in the data. For example, viewer engine 225 can determine an ending position in the data and select the portion of the data between the starting an ending position. The ending position can include an ending row or column, which can be based on the starting column or row. For example, the ending column or row can be the starting column or row plus a default number of rows or columns (e.g., row 110,243—the starting row 110,223 plus a default of 20 rows—and column 725,002—the starting column 724,992 plus a default of 10 columns). As an additional example, the ending column or row can be the starting column or row plus a number of rows or columns determined based on a size of the display. The number of rows or columns can further be based on an estimated row or column size. This estimated row or column size can be a default row or column size (e.g., a default that columns are allocated a width of 80 pixels or that rows are allocated a height of 12 pixels), a row or column size dependent on a datatype associated with the cell (e.g., assuming one default width for the column when it is associated with a string datatype and another default width for the column when it is associated with a double datatype), a row or column size specified by the row or column, or the like.

In operation 330 of method 300, viewer engine 225 can obtain the determined portion of the data. In some embodiments, viewer engine 225 can determine whether table 230 includes the selected portion of the data. If so, viewer engine 225 can update the display to depict the determined portion of the data. If not, viewer engine 225 can request data information for any missing part of the determined portion of the data from view model 220. As described with regards to FIG. 2, view model 220 can provide the requested data information. If necessary, view model 220 can obtain the requested data information from datasource 210.

In operation 340 of method 300, viewer engine 225 can create the table body and hierarchical headers using the obtained data information. Creating the table body can include determining column widths and row heights for the portion of the data. The column widths and row heights can be determined based on default values, specified heights or widths for rows or columns, datatypes associated with the rows or columns (e.g., a default column width can be associated columns of double, or a default row height can be associated with rows string data). In some embodiments, the column widths and row heights can be based on individual headers associated with the columns or rows. For example, the width of a column can be the larger of the default width and the width of a label for an individual column header associated with the column (e.g., the width of the column associated with parent header 123 in FIG. 1A may depend on the width of the label "Product Variant", as the width of that label may be greater than the default width of the column). Furthermore, the disclosed embodiments are not limited to determining column widths and row heights in any particular order.

In operation 340, viewer engine 225 can generate the hierarchical headers using the determined columns widths and row heights. Viewer engine 225 can determine a hierarchy of individual headers in the data information. Using the hierarchy of individual headers, viewer engine 225 can determine the size and relative positions of the individual headers included in the hierarchical header. The relative positions of the individual headers can be determined based on the child-parent relationships between the headers, with a parent of individual child headers placed further from a table body than the individual child headers. The extent of an individual header can be determined based on the extents of individual headers, if any, dependent on that individual header. The number of levels in a hierarchical header spanned by an individual header can be determined using the number of levels in the hierarchical header, a tree of child-parent relationships including the individual header, and the position of the individual header in the tree including the individual header. The determination of the hierarchical headers is described in detail below with regards to FIG. 4.

In operation 340, viewer engine 225 can draw the hierarchical headers aligned with the corresponding rows and columns of the table data. In some embodiments, the hierarchical headers are drawn on one or more upper layers superimposed upon a lower layer including the table body. The column header may remain frozen with respect to row translations, while the row header may remain frozen with respect to column translations.

In operation 350 of method 300, the viewer engine can be configured to depict a subset of the rendered table in the display. As described above with regards to operation 320, in some embodiments the viewer engine can be configured to determine the portion of the data to display based on an estimated row or column size. In some instances, viewer engine 225 can be configured to begin drawing the table based on the estimated row or column sizes before data values are available. For example, viewer engine 225 may estimate that a portion of the data includes 10 rows and 5 columns. However, viewer engine 225 may not know the datatypes, sizes, or individual headers associated with the portion of the data. While obtaining the portion of the data, viewer engine 225 can draw a table including hierarchical headers with a default number of levels (e.g., a single level) and blank cells with default widths and heights.

In operation 350, the viewer engine can determine the subset of the table to depict in the display based, at least in part, on the actual row or column size. For example, the estimated width of the first column may have been 80 pixels, but the actual width of the column may be 400 pixels. Accordingly, one or more of the rightmost columns in the determined portion of the data to display may not be displayed (as there may not be room to display them). As an additional example, an estimated width of the hierarchical column header may have been 24 pixels, but the actual with of the hierarchical column header may be 48 pixels. Accordingly, one or more of the bottommost rows in the determined portion of the data to display may not be displayed (as there may not be room to display them). Conversely, when the actual widths of the columns or heights of the rows (or hierarchical headers) are less than the estimated heights or widths, additional rightmost columns or bottommost rows may be displayed. In some embodiments, when the display includes a column scrollbar, the thumb size or position of the column scrollbar may be adjusted based on the subset of columns displayed in the table. When the actual width of the columns depicted in the display is greater than the estimated widths, fewer columns may be displayed than originally estimated, and the size or position of the thumb can be adjusted to increase the amount of the scrollbar to the right of the thumb. In this manner, the thumb position in the scrollbar can be updated to approximate a pixel position, rather than a column index, in the data, were the data rendered as a table. As a non-limiting example, when the data can be represented as a table with 10 columns, the last five columns comprised 80% of width of the table, moving the thumb of the column scroll bar to the middle of the scroll bar could result in selecting the fifth column as the starting column. When the columns are rendered, only one of the columns may be depicted in the display, due to the size of the columns, and the position of the thumb of the scroll bar can be adjusted to the 20% position. In this manner, the positions of the thumb in the scroll bar may approximate the pixel position, rather than the column index, in the data, were the data rendered as a table. Because the pixel position may be a more intuitive, or familiar, way of representing the position of the display in the overall table then the column index, adjusting the position of the thumb of the scroll bar in this manner may improve the user experience.

Figure 4:
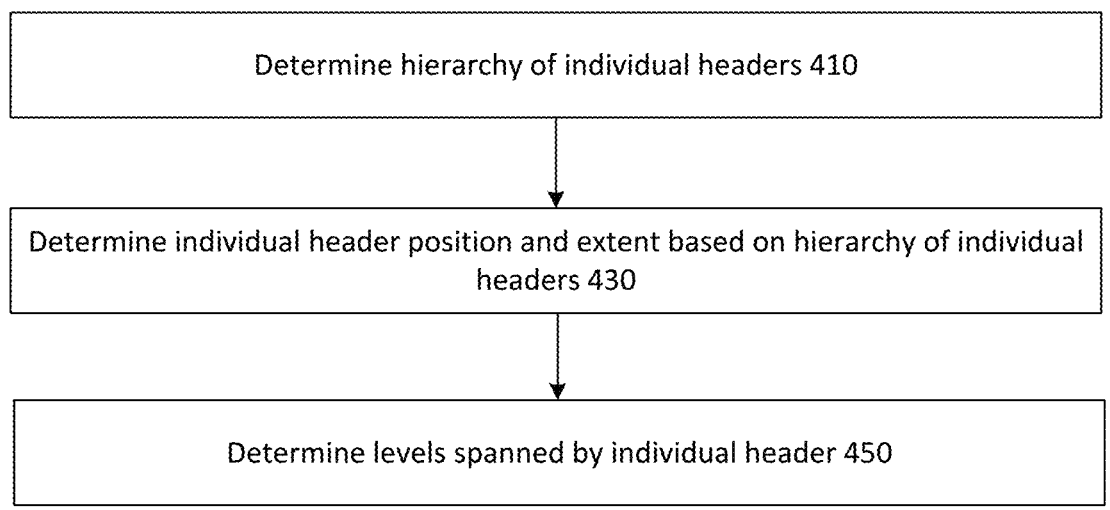
FIG. 4 depicts an exemplary method for determining an extent, relative position, and number of levels spanned by individual headers in a hierarchical header, consistent with disclosed embodiments.

FIG. 4 depicts an exemplary method 400 for determining an extent, relative position, and number of levels spanned by individual headers in a hierarchical header, consistent with disclosed embodiments. Method 400 can include operations of determining a hierarchy of individual headers in the data information, determining individual header position and extent based on the hierarchy of individual headers, and determining the levels spanned by the individual headers. Viewer engine 225 can use method 400 to determine the layout of the hierarchical headers depicted in display 250, without requiring data information corresponding to columns or rows outside of display 250. Accordingly, method 400 does not require viewer engine 225 to obtain metadata defining the entire hierarchical header. As the data can correspond to a table that may include tens of thousands to millions of rows or columns, the metadata defining the entire hierarchical header may be impractically large or time-consuming to obtain. Accordingly, method 400 can enable viewer engine 225 to display of portions of data that otherwise may be difficult or impractical to display, thereby improving the ability of users to interact with such large collections of data.

In step 410 of method 400, viewer engine 225 can be configured to determine a hierarchy of individual headers from data information for a portion of data. In some embodiments, the individual headers can correspond to attributes associated with the data. The data information can describe child-parent relationships between the attributes. In some embodiments, viewer engine 225 can generate one or more trees representing the child-parent relationships between the individual headers. Viewer engine 225 can trace such relationships backwards from child attribute to parent attribute. However, the disclosed embodiments are not limited to any particular method of generating trees representing the child-parent relationships by tracing such backward tracing of relationships. As a non-limiting example, viewer engine 225 can be configured to select an attribute lacking children. Viewer engine 225 can then identify a parent attribute of this child attribute. Viewer engine 225 can repeat this process until it reaches an attribute that does not depend on any other attribute. The viewer engine can then select another attribute lacking children, continuing to build trees representing child-parent relationships among the individual headers. For example, display 120 includes four individual headers. Two of these headers (e.g., "SKU" and "Quantity") have no children or parents while two of these headers have a child-parent relationships (e.g., "Size" is the child of "Product Variant"). Accordingly, the hierarchy of individual headers can include three trees, two trees including a single node (e.g., a tree with "SKU" as a node and a tree with "Quantity" as a node) and one tree including two nodes (e.g., a tree with "Size" as a node under "Product Variant"). In some embodiments, the hierarchy of individual headers can include a single tree with a node corresponding to the hierarchical header as the root.

In step 430 of method 400, viewer engine 225 can determine individual header position and extent based on the hierarchy of individual headers determined in step 410. For example, the number of levels in a hierarchical header can be greater than or equal to the maximum height of any tree associated with that hierarchical header. For example, when the individual headers in display 250 all lack parent or child headers, the height of the tree in display 250 is zero, and the number of levels in the hierarchical header is one (e.g., one plus the height). As an additional example, when one of the individual headers in display 250 has a parent header, which in turn has a parent header, the height of the tree in display 250 is two, and the number of levels in the hierarchical header is three (e.g., one plus the height).

In step 430 of method 400, viewer engine 225 can determine the individual header position and extent based on the hierarchy of individual headers. An individual header can be aligned by viewer engine 225 with a column or row associated with that individual header. When an individual header has a child individual header, the child individual header can be placed by viewer engine 225 between the parent individual header and the row or column associated with the individual header. For example, when a hierarchical column header is placed above the columns, a parent individual header associated with two columns can be aligned with the two columns, which can be grouped under the individual header (e.g., span header column 131 in FIG. 1A). In this example, two child individual headers can each depend on the parent individual header. Each child individual header can be associated with one of the columns. Each child individual header can be aligned by viewer engine 225 with the column with which it is associated and positioned below the parent individual header (e.g., grouped child headers 133 in FIG. 1A). The extent of each individual header lacking children can be based on the extent of the row or column with which it is associated. The extent of each individual header with at least one individual child header can be based on the extent of this at least one individual child header. To continue the prior example, the extent of the parent individual header can be based on the extent of the two individual child headers (e.g., the extent of span header column 131 can be the sum of grouped child headers 133).

In step 450 of method 400, viewer engine 225 can determine levels spanned by individual headers in the hierarchical header. As described herein, the number of levels in the hierarchical header can depend on the hierarchy of individual headers for the portion of data. In some embodiments, the number of levels in the hierarchical header can depend on a maximum tree height among trees associated with the hierarchical header. In some embodiments, individual headers that are leaf nodes in a tree can span multiple levels. The number of additional levels spanned by such individual headers can depend on a difference between number of levels in the hierarchical header and the depth in the tree of the individual header. For example, when an individual header has no individual child headers and no individual parent header, the tree including the individual header has a single node corresponding to the individual header and the depth of the individual header in the tree is zero. When the number of levels in the hierarchical header is three, the individual header spans three levels (e.g., like span header row 151). As an additional example, when an individual header has no individual child headers and a parent header, the depth in the tree of the individual header is one. When the number of levels in the hierarchical header is three, the individual header spans two additional levels (e.g., like span header row 141). As a further example, when the individual header has an individual child header, the individual header is not a leaf node in the tree containing the individual header and therefor spans no additional levels.

In some embodiments, the additional levels may be allocated to individual headers that are not leaf nodes in a tree representing child-parent relationships. For example, the individual levels may be allocated to an individual header corresponding to an interior node or root node of a tree representing child-parent relationships.

In some embodiments, the number of levels in a hierarchical header can change as user interactions cause different portion of the data to be displayed. For example, different portions of the data may include different individual headers having different child-parent relationships and therefore different hierarchical relationships. The maximum tree heights for these different hierarchical relationships can differ. Accordingly, in some embodiments, the number of levels in hierarchical headers associate with these different portion of the data can differ. However, having the number of levels in a hierarchical header change as a user interacts with the display (e.g. by scrolling along columns) can disrupt the user experience.

In some embodiments, to reduce the frequency of disruptive changes in the number of hierarchical header levels, the number of levels in a present hierarchical header can depend both on the maximum tree height for the present hierarchical header and a stored number of levels. In some embodiments, the stored number of levels can be the number of levels for a previous hierarchical header. The previous hierarchical header can be the hierarchical header associated with the previously displayed portion of the data. In various embodiments, the stored number can be a maximum number of levels encountered. The number of levels in the present hierarchical header can be the greater of the maximum tree height for the present hierarchical header plus one and the stored number of levels. As a non-limiting example, the leftmost column in a display can be associated with three individual headers, while the remaining columns in the display can be associated with one individual header. Accordingly, the hierarchical header for the display can include three levels. In response to a user interaction, viewer engine 225 can display a portion of the data shifted one column to the right. All columns in the display may now be associated with one individual header. The maximum tree height for individual headers in the updated display would be zero (so the number of levels in the hierarchical header would be one). But changing the display from a three-level hierarchical header to a one-level hierarchical header may disrupt the user experience. Accordingly, the number of levels in the hierarchical header may remain three. All of the individual column headers in the updated display may then span three levels.

FIG. 5 depicts updating an exemplary display in response to receipt of streaming data information, consistent with disclosed embodiments. As disclosed above with regards to FIG. 2, in some embodiments, datasource 210 can be configured to generate data information and stream that data information to view model 220. View model 220 can be configured to pass that data information on to the viewer engine. In some embodiments, view model 220 can be configured to determine whether the data information received from datasource 210 falls within the most recently requested portion of the data obtained by the view engine. When the data information falls within the most recently requested portion of the data, view model 220 can be configured to stream the data information to the viewer model.

Display 510 depicts a display of a portion of the data. As disclosed above with regards to FIG. 2, display 510 can be a subset of a table rendered by viewer engine 225 using data information received from view model 220. In response to receiving data information streamed by view model 220, viewer engine 225 can be configured to render the portion of the data into a table. Display 530 can be a subset of this newly rendered table. As shown, display 530 can include inserted column 531. Viewer engine 225 can be configured to re-determine the hierarchical headers for the display based on the individual headers associated with the depicted columns. In this example, inserted column 531 is associated with the individual headers "Color" and "Product Variant". The individual header "Color" is a child of the individual header "Product Variant". Consistent with this child-parent relationship, inserted column 531 can be grouped with other columns associated with other individual headers also children of the individual header "Product Variant". In some embodiments, this grouping can be performed through the association of column indices with data values by datasource 210 or view model 220. In various embodiments, this grouping can be performed by the viewer engine based on the associations between data values and attributes and the child-parent relationships between attributes in the obtained portion of the data.

In this example, the generation of inserted column 531 increases the size of the data. In addition to depicting inserted column 531, the viewer engine can update a position of the thumb of the scrollbar displayed with display 530 to reflect this increase in the size of the data (e.g., adjusted scrollbar 533). As disclosed herein, the adjusted scrollbar can represent an approximate position of the displayed portion of the data.

Figure 6:
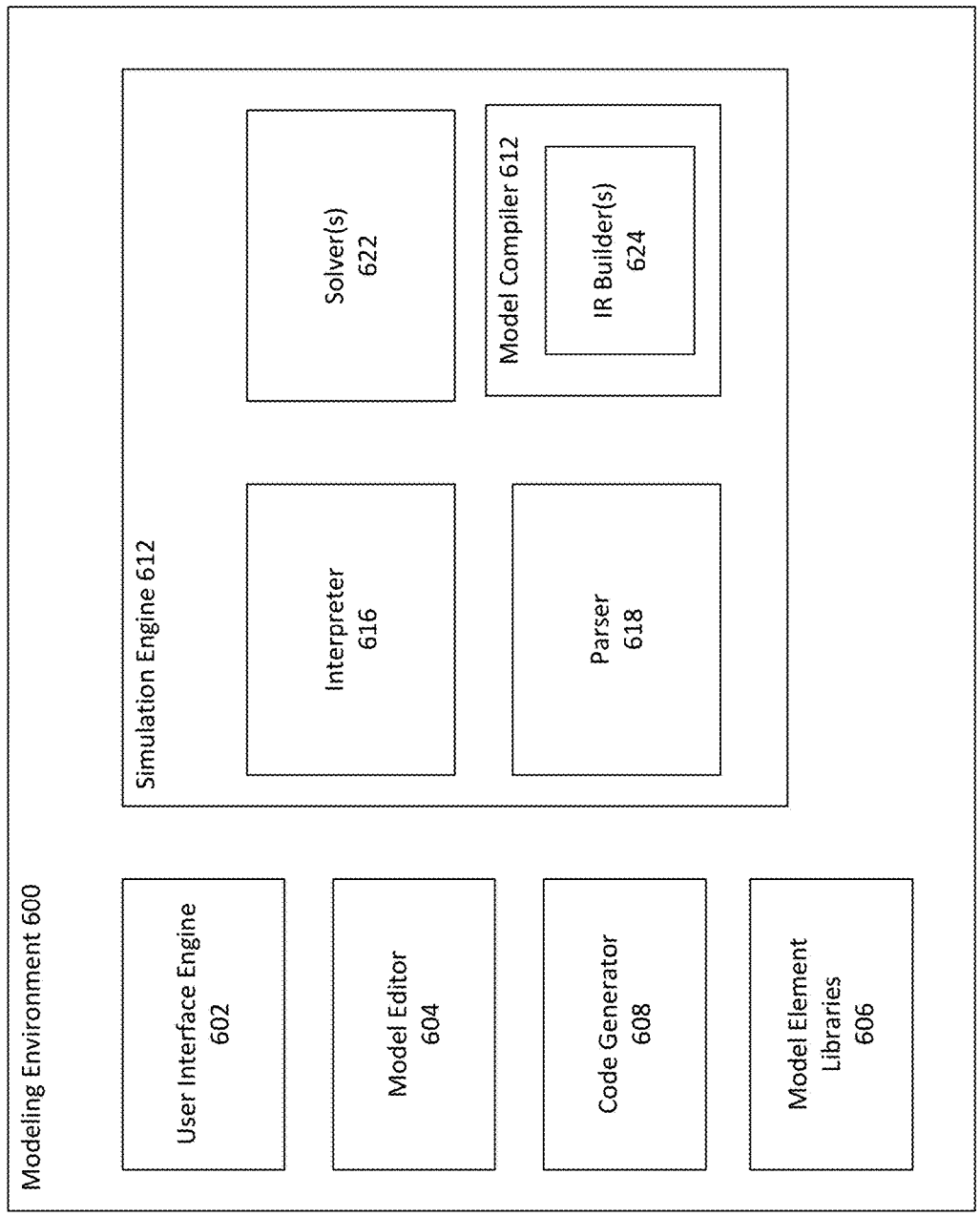
FIG. 6. depicts an exemplary modeling environment useable to develop and simulate models suitable for use with the disclosed embodiments, consistent with the disclosed embodiments.

FIG. 6. depicts an exemplary modeling environment useable to develop and simulate models suitable for use with the disclosed embodiments, consistent with the disclosed embodiments. The modeling environment 600 can include a User Interface (UI) engine 602, a model editor 604, one or more model element libraries 606, a code generator 608, and a simulation engine 612. The UI engine 602 can create and present one or more User Interfaces (UIs), such as Graphical User Interfaces (GUIs) and/or Command Line Interfaces (CLIs), on a display of a data processing device, such as a workstation, laptop, tablet, etc. The GUIs and CLIs can provide a user interface to the modeling environment 600, such as a model editing window. The model editor 604 can perform selected operations on a model, such as open, create, edit, and save, in response to the user inputs or programmatically.

In some embodiments, UI engine 602 can be configured to perform the disclosed methods of displaying portions of data. For example, UI engine 602 can include one or more components of FIG. 2 described herein, such as viewer engine 225 or view model 220. In various embodiments, view engine 225 or view model 220 can be distinct from UI engine 602. For example, view engine 225 or view model 220 can be a component of modeling environment 600, or a component of another system including both view model 220 and modeling environment 600. As described herein, consistent with disclosed embodiments, the viewer engine of UI engine 602 can be configured to obtain data information from view model 220, render a table based on the obtained information using view engine 255, and depict a subset of that table in a display. In response to a user interaction, the viewer engine of UI engine 602 can update the display. In some embodiments, modeling environment 600 can include or be communicatively connected to datasource 210. As a non-limiting example, datasource 210 can be a database accessible to modeling environment 600, or a software component of modeling environment 600 configured to generate streaming data.

The simulation engine 612 can include an interpreter 616, a parser 618, a model compiler 620, and one or more solvers (e.g., solver(s) 622). The model compiler 620 can include one or more Intermediate Representation (IR) builders (e.g., IR builder(s) 624). In some implementations, the one or more IR builders can be included or associated with the solvers 622. The simulation engine 612 can execute, e.g., compile and run or interpret, computer-generated, executable models using solver(s) 622. For example, solver(s) 622 can generate a set of equations for a model, and can solve the set of equations. Solver(s) 622 can also generate a solution for an in-memory, intermediate representation (IR) of a model that represents a set of equations. Solver(s) 622 can generate the solution for the IR using numerical techniques. Exemplary solvers include one or more fixed-step continuous time solvers, which can utilize numerical integration techniques, and one or more variable-step solvers, which may, for example, be based on the Runge-Kutta or Dormand-Prince pair. With a fixed-step solver, the step size remains constant throughout simulation of the model. With a variable-step solver, the step size can vary from step to step, for example to meet error tolerances. A non-exhaustive description of suitable solvers may be found in the *Simulink User's Guide* from The MathWorks, Inc. (March 2017 ed.)

Code generator 608 can access a model and can generate code for the model. In some embodiments, the generated code can be source code, which can be compiled by the model compiler 620, and executed by one or more processors outside of the modeling environment 600. The generated code can thus be standalone code relative to the modeling environment 600. Examples of generated code include Ada, Basic, C, C++, C#, FORTRAN, assembly code, and Hardware Description Language (HDL) code, such as VHDL, Verilog, or SystemC, among others, which may be used to synthesize a programmable logic device.

Exemplary modeling environments include the MATLAB® technical computing environment (TCE) and the Simulink® model-based design environment both from The MathWorks, Inc. of Natick, Mass., as well as the Simscape™ physical modeling system, the SimEvent® discrete-event modeling tool, and the Stateflow® state chart tool also from The MathWorks, Inc., the MapleSim physical modeling and simulation tool from Waterloo Maple Inc. of Waterloo, Ontario, Canada, the GTSUITE modeling and simulation environment from Gamma Technologies, LLC of Chicago, Ill., the Ricardo WAVE and WAVE RT modeling and simulation tools of Ricardo Software of Chicago, Ill., a subsidiary of Ricardo plc, the AVL Boost modeling and simulation tool of AVL Gmbh of Graz, Austria, the LabVIEW virtual instrument programming system and the NI MatrixX model-based design product both from National Instruments Corp. of Austin, Tex., the Visual Engineering Environment (VEE) product from Keysight Technologies Inc. of Santa Rosa, Calif., the System Studio model-based signal processing algorithm design and analysis tool and the SPW signal processing algorithm tool from Synopsys, Inc. of Mountain View, Calif., a Unified Modeling Language (UML) system, a Systems Modeling Language (SysML) system, the System Generator system from Xilinx, Inc. of San Jose, Calif., and the Rational Rhapsody Design Manager software from IBM Corp. of Somers, N.Y. Models created in the high-level modeling environment can contain less implementation detail, and thus operate at a higher level than certain programming languages, such as the C, C++, C#, and SystemC programming languages.

With a modeling environment 600, simulated execution of a model can be carried out, e.g., to approximate the operation of a dynamic system. Simulated execution of a model may also be referred to as simulating the model. Models constructed within the modeling environment 600 may include textual models, graphical models, such as block diagrams, state-based models, discrete-event models, physical models, and combinations thereof. A graphical model can include icons or blocks that represent computations, functions or operations, and interconnecting lines or arrows among the blocks can represent data, signals, or relationships among those computations, functions, or operations. The icons or blocks, moreover, can be selected by the user from one or more of the libraries or palettes 606 that contain icons or blocks for the blocks supported by the modeling environment 600. A model editor GUI can include a Run button that can be selected by the user. The modeling environment 600 can also be configured to receive a run command entered by the user, e.g., in the GUI or in a Command Line Interface (CLI). In response to the user selecting the Run button or entering the run command, the simulation engine 612 can execute the model, and can present the results of the model's execution to a user. Exemplary graphical models include Simulink models, Simscape physical models, SimEvent models, Stateflow charts, LabVIEW block diagrams, MatrixX models, Scade models, and VEE diagrams, among others. Other forms of the source program include Modelica models from the Modelica Association, Uniform Modeling Language (UML) models, and Systems Modeling Language (SysML) models, among others.

The MATLAB® TCE is a math-oriented, textual programming environment for digital signal processing (DSP) design, among other uses. The Simulink® model-based design environment is a modeling tool for modeling and simulating dynamic and other systems, among other uses. The MATLAB® and Simulink® environments provide a number of high-level features that facilitate algorithm development and exploration, and support model-based design. Exemplary high-level features include dynamic typing, array-based operations, data type inferencing, sample time inferencing, and execution order inferencing, among others.

In some embodiments, the modeling environment 600 may implement a declarative language. A declarative language is a language that expresses the logic of a computation without describing its control flow. A declarative language can describe what a program must accomplish in terms of the problem domain, rather than describe how to accomplish it as a sequence of the programming language primitives. In some cases, a declarative language can implement single assignment in which variables are assigned once and only once. Examples of declarative languages include the Simulink® model-based design environment, which is a time-based language, the Modelica modeling language, and the LabVIEW graphical programming system, Hardware Description Language (HDL), the Prolog language, and the Haskell language, among others. Behaviors of at least some of the model elements and connection elements of a model can include computational implementations that are implicitly defined by a declarative language.

It should be understood that the modeling environment 600 is intended for illustrative purposes and that the present disclosure can be used with other modeling environments. For example in some implementations, the code generator 608 and/or the compiler 620 can be separate from the modeling environment 600.

One or more of the user interface engine 602, the model editor 604, the code generator 608, the model compiler 620, and the simulation engine 612 can be implemented through one or more software modules and/or libraries containing program instructions that perform the methods described herein when executed on logic circuitry of one or more processors. The software modules can be stored in a memory, such as a main memory, a persistent memory and/or a computer readable media, of a workstation, server, or other data processing machine or device, and executed by one or more processors. Other computer readable media can also be used to store and execute these program instructions, such as non-transitory computer readable media, including optical, magnetic, or magneto-optical media. In some embodiments, one or more of the user interface engine 602, the model editor 604, the code generator 608, the model compiler 620, and the simulation engine 612 can comprise hardware registers and combinational logic configured and arranged to produce sequential logic circuits. In some embodiments, various combinations of software and hardware, including firmware, can be utilized to implement the described methods.

Suitable code generators for use with the present disclosure include, but are not limited to, the Simulink Coder, the Embedded Coder, and the Simulink HDL Coder products from The MathWorks, Inc. of Natick, Mass., and the TargetLink product from dSpace GmbH of Paderborn Germany. Suitable target language compilers include the xPC Target™ tool from The MathWorks, Inc., and a C language compiler. However, other code generation systems and other compilers can be used in addition to or alternative to those described for the modeling environment 600.

Figure 7:
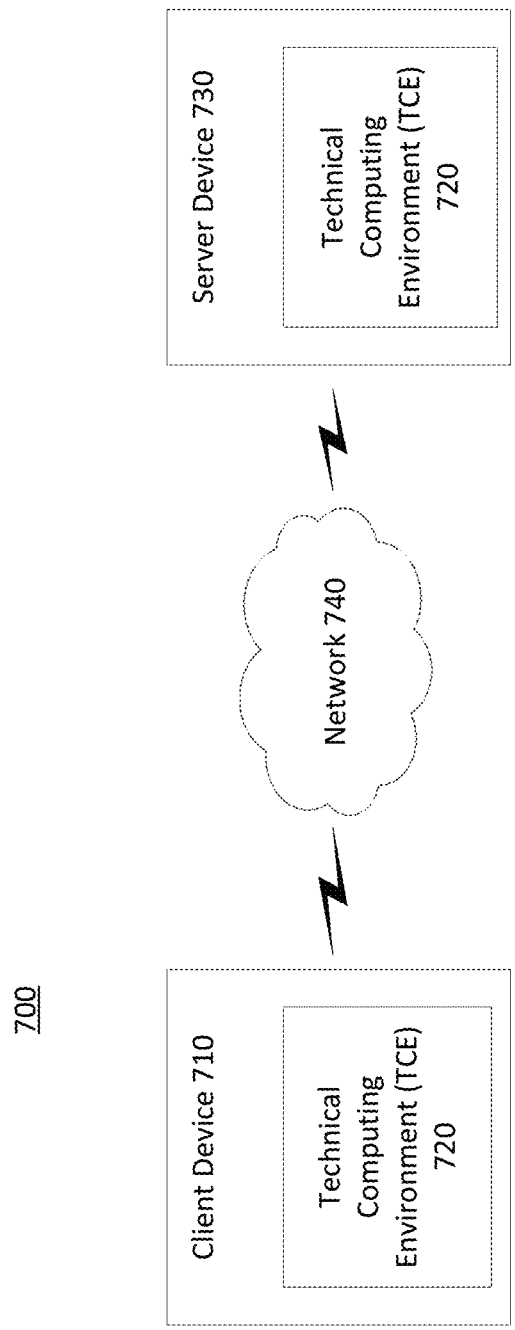
FIG. 7 depicts an exemplary computing environment in which systems and/or methods, described herein, may be implemented, consistent with disclosed embodiments.

FIG. 7 depicts an exemplary computing environment 700 in which systems and/or methods, described herein, may be implemented, consistent with disclosed embodiments. As shown in FIG. 7, environment 700 may include a client device 710, which may include a programming environment (e.g., TCE 720). Furthermore, environment 700 may include a server device 730, which may include the programming environment (e.g., TCE 720), and a network 740. Devices of environment 700 may interconnect via wired connections, wireless connections, or a combination of wired and wireless connections.

Client device 710 may include one or more devices capable of receiving, generating, storing, processing, and/or providing program code or information associated with program code (e.g., text, a token, an error, a pattern, etc.). For example, client device 710 may include a computing device, such as a desktop computer, a laptop computer, a tablet computer, a mobile phone (e.g., a smart phone, a radiotelephone, etc.), or a similar device. Client device 710 may receive input text, via TCE 720, in a programming language associated with TCE 720. Client device 710 may process the input text to determine whether the input text is valid. When the input text is invalid, client device 710 may determine valid program code based on the input text, as described in more detail elsewhere herein. Client device 710 may prompt a user (e.g., via a user interface of TCE 720) regarding the valid program code or may replace the input text with the valid program code. In some implementations, client device 710 may receive information from and/or transmit information to server device 730.

Client device 710 may host TCE 720. TCE 720 may include any hardware-based component or a combination of hardware and software-based components that provides a computing environment that allows tasks to be performed (e.g., by users) related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In some implementations, TCE 720 may include a programming language that supports dynamic typing (e.g., the M language, a MATLAB® language, a MATLAB-compatible language, a MATLAB-like language, *Julia*, Python, etc.) that can be used to express problems and/or solutions in mathematical notations.

For example, TCE 720 may use an array as a basic element, where the array may not require dimensioning. These arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations. In addition, TCE 720 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state-based analysis and/or design, etc.

TCE 720 may further provide mathematical functions and/or graphical tools (e.g., for creating plots, surfaces, images, volumetric representations, etc.). For example, TCE 720 can provide graphical tools for viewing or analysis of large datasets, as described herein. In some embodiments, TCE 720 can enable implementation of viewer engine 225, support establishment of view model 220, and enable a user to connect view model 220 to a datasource (e.g., datasource 210). Thus, consistent with disclosed embodiments, TCE 720 can enable a user to display portions of data stored or being generated by the datasource. In some implementations, TCE 720 may provide these functions and/or tools using toolboxes (e.g., toolboxes for signal processing, image processing, data plotting, parallel processing, etc.). In some implementations, TCE 720 may provide these functions as block sets or in another way, such as via a library, etc.

TCE 720 may be implemented as a text-based programming environment (e.g., MATLAB software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.), a graphically-based programming environment (e.g., Simulink® software, Stateflow® software, SimEvents® software, Simscape™ software, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; aspects of a Unified Modeling Language (UML) or SysML environment; etc.), or another type of programming environment, such as a hybrid programming environment that includes one or more text-based programming environments and one or more graphically-based programming environments.

TCE 720 may include a programming language (e.g., the MATLAB language) that may be used to express problems and/or solutions in mathematical notations. The programming language may allow a user to enter commands to be executed by TCE 720. The programming language may be dynamically typed and/or array-based. In a dynamically typed array-based computing language, data may be contained in arrays and data types of the data may be determined (e.g., assigned) at program execution time.

For example, suppose a program, written in a dynamically typed array-based computing language, includes the following statements:

A='hello'
A=int32([1, 2])
A=[1.1, 2.2, 3.3]

Now suppose the program is executed, for example, in a TCE, such as TCE 720. During run-time, when the statement "A='hello'" is executed, the data type of variable "A" may be a string data type. Later when the statement "A=int32([1, 2])" is executed, the data type of variable "A" may be a 1-by-2 array containing elements whose data type are 32-bit integers. Later, when the statement "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based computing language may be contained in an array. Moreover, the data type of the data may be determined during execution of the program. Thus, in a dynamically type array-based computing language, data may be represented by arrays and data types of data may be determined at run-time.

TCE 720 may provide mathematical routines and a high-level programming language suitable for non-professional programmers. TCE 720 may provide graphical tools that may be used for creating plots, surfaces, images, volumetric representations, or other representations. TCE 720 may provide these routines and/or tools using toolboxes (e.g., toolboxes for signal processing, image processing, data plotting, parallel processing, etc.). TCE 720 may also provide these routines in other ways, such as, for example, via a library, a local data structure, a remote data structure (e.g., a database operating in a computing cloud), a remote procedure call (RPC), and/or an application programming interface (API). TCE 720 may be configured to improve runtime performance when performing computing operations. For example, TCE 720 may include a just-in-time (JIT) compiler.

Server device 730 may include one or more devices capable of receiving, generating, storing, processing, and/or providing information associated with code. For example, server device 730 may include a computing device, such as a server, a desktop computer, a laptop computer, a tablet computer, or a similar device. In some implementations, server device 730 may host TCE 720. In some implementations, client device 710 may be used to access one or more TCEs 720 running on one or more server devices 730. For example, multiple server devices 730 may be used to execute program code (e.g., serially or in parallel), and may provide respective results of executing the program code to client device 710.

In some implementations, client device 710 and server device 730 may be owned by different entities. For example, an end user may own client device 710, and a third party may own server device 730. In some implementations, server device 730 may include a device operating in a cloud computing environment. In this way, front-end applications (e.g., a user interface) may be separated from back-end applications (e.g., program code execution). Additionally, or alternatively, server device 730 may perform one, more, or all operations described elsewhere herein as being performed by client device 710.

Network 740 may include one or more wired and/or wireless networks. For example, network 740 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a private network, a cloud computing network, and/or a combination of these or other types of networks.

The number and arrangement of devices and networks shown in FIG. 7 are provided as an example. In practice, there may be additional devices and/or networks, fewer devices and/or networks, different devices and/or networks, or differently arranged devices and/or networks than those shown in FIG. 7. Furthermore, two or more devices shown in FIG. 7 may be implemented within a single device, or a single device shown in FIG. 7 may be implemented as multiple, distributed devices. Additionally, or alternatively, a set of devices (e.g., one or more devices) of environment 700 may perform one or more functions described as being performed by another set of devices of environment 700.

Figure 8:
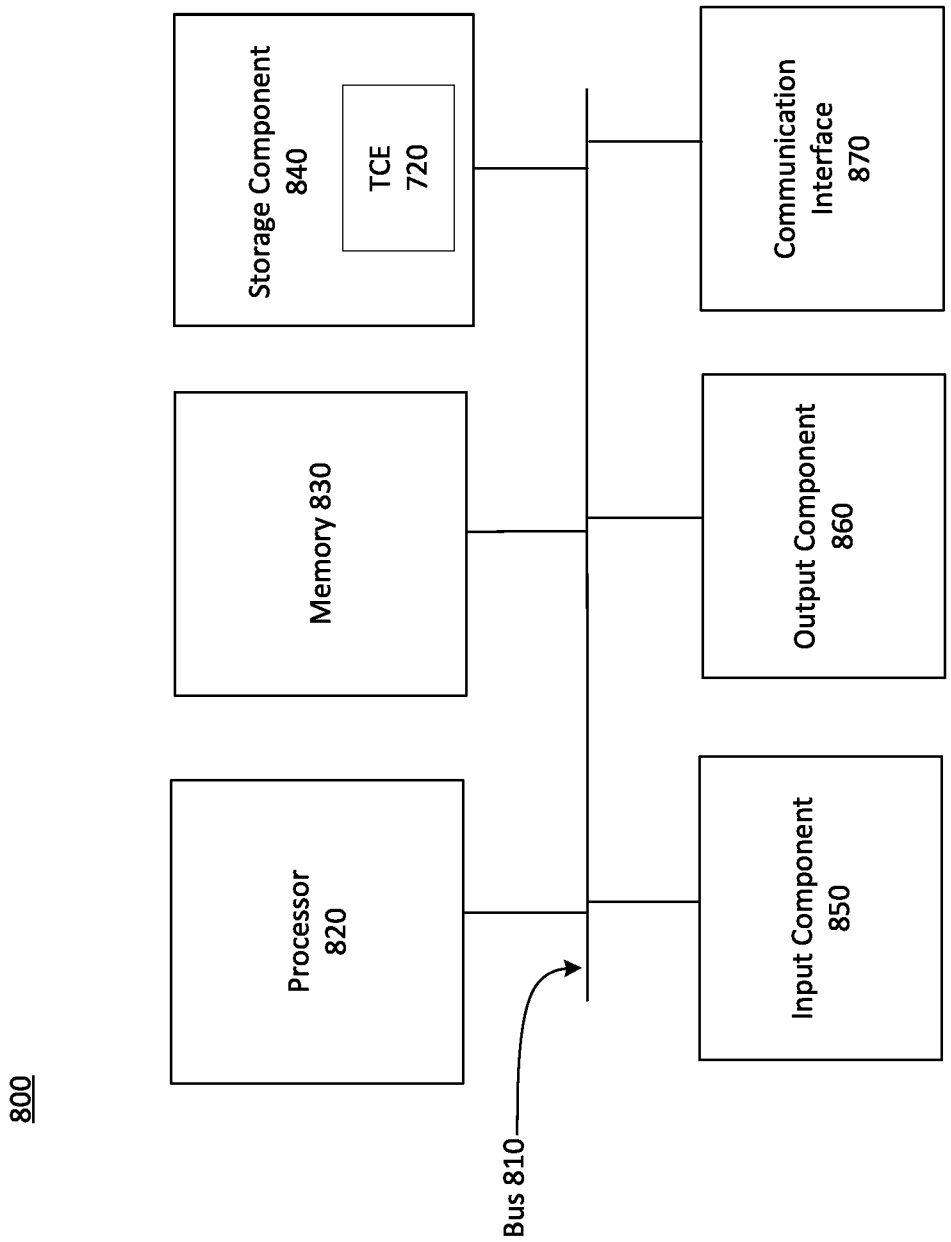
FIG. 8 depicts an exemplary device suitable for use consistent with the disclosed embodiments.

FIG. 8 depicts an exemplary device 800 suitable for use consistent with the disclosed embodiments. Device 800 may correspond to client device 710, server device 730, or a like device. In some implementations, client device 710, server device 730, or the like device may include at least one of device 800 or at least one component of device 800. As shown in FIG. 8, device 800 may include a bus 810, a processor 820, a memory 830, a storage component 840, an input component 850, an output component 860, and a communication interface 870.

Bus 810 can include a component that permits communication among the components of device 800. Processor 820 can be implemented in hardware, firmware, or a combination of hardware and software. Processor 820 can be a central processing unit (CPU), a graphics processing unit (GPU), an accelerated processing unit (APU), a microprocessor, a microcontroller, a field-programmable gate array (FPGA), an application-specific integrated circuit (ASIC), or another suitable processing component. In some implementations, processor 820 can include one or more processors capable of being programmed to perform a function. Memory 830 can include a random-access memory (RAM), a read-only memory (ROM), or another suitable dynamic or static storage device (e.g., a flash memory, a magnetic memory, and/or an optical memory) that stores information and/or instructions for use by processor 820.

Storage component 840 can store information and/or software (e.g., TCE 720) related to the operation and use of device 800. For example, storage component 840 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 850 can include a component that permits device 800 to receive information, such as via user input (e.g., a touch screen display, a keyboard, a keypad, a mouse, a button, a switch, and/or a microphone). Additionally, or alternatively, input component 850 can include a sensor for sensing information (e.g., a global positioning system (GPS) component, an accelerometer, a gyroscope, and/or an actuator). Output component 860 can include a component that provides output information from device 800 (e.g., a display, a speaker, and/or one or more light-emitting diodes (LEDs)).

Communication interface 870 can include a transceiver-like component (e.g., a transceiver and/or a separate receiver and transmitter) that enables device 800 to communicate with other devices, such as via a wired connection, a wireless connection, or a combination of wired and wireless connections. Communication interface 870 can permit device 800 to receive information from another device and/or provide information to another device. For example, communication interface 870 can include an Ethernet interface, an optical interface, a coaxial interface, an infrared interface, a radio frequency (RF) interface, a universal serial bus (USB) interface, a Wi-Fi interface, a cellular network interface, or the like.

Device 800 can be configured to perform one or more processes described herein. Device 800 may perform these processes (e.g., a computer-implemented method) in response to processor 820 executing software instructions stored by a non-transitory computer-readable medium, such as memory 830 or storage component 840. A computer-readable medium can be a non-transitory memory device. A memory device can include memory space within a single physical storage device or memory space spread across multiple physical storage devices.

Software instructions can be read into memory 830 or storage component 840 from another computer-readable medium or from another device via communication interface 870. When executed, software instructions stored in memory 830 or storage component 840 can cause processor 820 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 8 are provided as an example. In practice, device 800 can include additional components, fewer components, different components, or differently arranged components than those shown in FIG. 8. Additionally, or alternatively, a set of components (e.g., one or more components) of device 800 may perform one or more functions described as being performed by another set of components of device 800.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A non-transitory, computer-readable medium containing instructions that, when executed by at least one processor of a system, cause the system to perform operations, comprising:
   detecting, by a viewer engine, a user interaction with a display of a portion of data;
   determining, by the viewer engine and based on the user interaction, a second portion of the data to display;
   obtaining, by the viewer engine from a view model, data information for the second portion of the data, the data information comprising:
      information about headers for the second portion of the data, and
      information about child-parent relationships between the headers;
   creating, by the viewer engine using the data information, a table including one or more hierarchical headers, creation of the table comprising:
      determining, by back-tracing the child-parent relationships between the headers from child headers to parent headers, a hierarchical relationship among individual headers in a hierarchical header of the one or more hierarchical headers;
      determining a first number of levels of the hierarchical header based on the hierarchical relationship;
      determining positions and extents for the individual headers based on the hierarchical relationship; and
      determining a second number of levels in the hierarchical header, the second number being a number of the levels in the hierarchical header spanned by one of the individual headers, the determination of the second number comprising:
         determining that the one of the individual headers is a leaf node in a tree representing child-parent relationships among the individual headers;
         determining a depth of the one of the individual headers in the tree; and
         allocating a number of additional levels to the one of the individual headers based on the first number of levels of the hierarchical header and the depth of the one of the individual headers in the tree; and
   displaying, by the viewer engine, a display depicting at least a subset of the table including the second portion of the data.

2. The non-transitory, computer-readable medium of claim 1, wherein obtaining the data information comprises:
   requesting, by the viewer engine from the view model, the data information; and
   receiving the data information in response to the request.

3. The non-transitory, computer-readable medium of claim 1, wherein obtaining the data information comprises:
receiving data information pushed to the viewer engine by the view model.

4. The non-transitory, computer-readable medium of claim 1, wherein the method further comprises:
receiving, by the view model from a datasource, the data information in response to a request from the view model to the datasource; or
receiving, by the view model from the datasource, data streamed by the datasource.

5. The non-transitory, computer-readable medium of claim 4, wherein:
the view model receives data streamed by the datasource; and
the datasource comprises a software tool, network edge device, or sensor configured to generate streaming data.

6. The non-transitory, computer-readable medium of claim 1, wherein:
the user interaction comprises adjustment of a position in a scrollbar; and
determining an updated portion of the table to display comprises mapping the adjusted position in the scrollbar to at least one of a row index or column index for the data based on a total number of rows or columns for the data.

7. The non-transitory, computer-readable medium of claim 1, wherein:
a number of rows or columns for the portion of the data depends on a width of the display and an estimated row height or column width.

8. The non-transitory, computer-readable medium of claim 1, wherein:
the first number of levels of the hierarchical header is based on:
a maximum tree height for the hierarchical header; and
a previous maximum number of levels.

9. The non-transitory, computer-readable medium of claim 1, wherein:
determining extents for the individual headers based on the child-parent relationships comprises:
determining extents of child headers of a second one of the individual headers; and
determining an extent of the second one of the individual headers based on the determined extents of the child headers.

10. The non-transitory, computer-readable medium of claim 1, wherein:
the user interaction comprises selecting a level in the hierarchical header, and
scrolling through adjacent sets of rows or columns, the adjacent sets corresponding to adjacent headers at the selected level in the hierarchical header.

11. The non-transitory, computer-readable medium of claim 1, wherein:
the display depicts a subset of rows and columns in the table.

12. A method, comprising:
receiving, by a viewer engine in response to a user interaction, data information from a view model, the data information comprising:
information about column headers for a portion of data, and
information about child-parent relationships between the column headers;
creating a hierarchical column header, creation of the hierarchical column header comprising:
back-tracing the child-parent relationships for the column headers from child headers to parent headers to determine a hierarchical relationship among the column headers; and
determining a number of levels in the hierarchical column header based on the child-parent relationships, the determination comprising:
determining a maximum height among trees representing child-parent relationships for the column headers; and
comparing the maximum height to a maximum number of levels determined for previously displayed hierarchical headers; and
displaying the portion of the data together with the hierarchical column header.

13. The method of claim 12, wherein:
creation of the hierarchical column header comprises:
positioning the column headers in the hierarchical column header based on the child-parent relationships between the column headers.

14. The method of claim 12, wherein:
creation of the hierarchical column header comprises:
determining extents for the column headers based on the child-parent relationships, comprising:
determining extents of child column headers of one of the column headers; and
determining an extent of the one of the column headers based on the determined extents of the child column headers.

15. The method of claim 12, wherein the method further comprises:
receiving, by the view model from a datasource, the data information in response to a request from the view model to the datasource; or
receiving, by the view model from the datasource, data streamed by the datasource.

16. The method of claim 12, wherein:
the view model receives data streamed by a datasource; and
the datasource comprises a software tool, network edge device, or sensor configured to generate streaming data.

17. The method of claim 12, wherein:
the user interaction comprises adjustment of a position in a scrollbar; and
the data information received from the view model is requested by the viewer engine based on a mapping of the adjusted position in the scrollbar to at least one of a row index or column index for the data based on a total number of rows or columns for the data.

18. A system comprising:
at least one processor; and
at least one non-transitory, computer-readable medium containing instructions that, when executed by the at least one processor, cause the system to perform operations comprising:
receiving, by a viewer engine in response to a user interaction, data information from a view model, the data information comprising:
information about column headers for a portion of data, and
information about child-parent relationships between the column headers;
creating a hierarchical column header, creation of the hierarchical column header comprising:
back-tracing the child-parent relationships for the column headers from child headers to parent headers to determine a hierarchical relationship among the column headers; and determining a number of levels in the hierarchical column header based on the child-parent relationships, the determination comprising:

determining a maximum height among trees representing child-parent relationships for the column headers; and comparing the maximum height to a maximum number of levels determined for previously displayed hierarchical headers; and displaying the portion of the data together with the hierarchical column header.

19. The system of claim 18, wherein:

creation of the hierarchical column header comprises:

positioning the column headers in the hierarchical column header based on the child-parent relationships between the column headers.

20. The system of claim 18, wherein:

creation of the hierarchical column header comprises:

determining extents for the column headers based on the child-parent relationships, comprising:

determining extents of child column headers of one of the column headers; and determining an extent of the one of the column headers based on the determined extents of the child column headers.

21. The system of claim 18, wherein:

the user interaction comprises adjustment of a position in a scrollbar; and the data information received from the view model is requested by the viewer engine based on a mapping of the adjusted position in the scrollbar to at least one of a row index or column index for the data based on a total number of rows or columns for the data.

* * * * *